(12) United States Patent
Radzicki et al.

(10) Patent No.: US 9,901,845 B2
(45) Date of Patent: Feb. 27, 2018

(54) REDUCING AND REMOVING FOULANT FROM REGENERATED AMINE MIXTURES

(71) Applicant: ExxonMobil Chemical Patents Inc., Baytown, TX (US)

(72) Inventors: Michael A. Radzicki, Houston, TX (US); Richard A. Symes, Midlothian (GB); Asit K. Mondal, Singapore (SG)

(73) Assignee: ExxonMobil Chemical Patents Inc., Baytown, TX (US)

( * ) Notice: Subject to any disclaimer, the term of this patent is extended or adjusted under 35 U.S.C. 154(b) by 387 days.

(21) Appl. No.: 14/629,602

(22) Filed: Feb. 24, 2015

(65) Prior Publication Data
US 2015/0298026 A1 Oct. 22, 2015

Related U.S. Application Data

(60) Provisional application No. 61/981,258, filed on Apr. 18, 2014.

(30) Foreign Application Priority Data

May 23, 2014 (EP) .................................... 14169716

(51) Int. Cl.
*B01D 19/00* (2006.01)
*B01D 53/14* (2006.01)
(Continued)

(52) U.S. Cl.
CPC ..... *B01D 19/0005* (2013.01); *B01D 53/1425* (2013.01); *B01D 53/1462* (2013.01); *C10K 1/004* (2013.01); *C10K 1/005* (2013.01); *C10K 1/08* (2013.01); *C10L 3/10* (2013.01); *B01D 2252/204* (2013.01); *B01D 2252/61* (2013.01); *B01D 2256/24* (2013.01); *Y02P 20/152* (2015.11)

(58) Field of Classification Search
CPC ...... B01D 2252/2021; B01D 2252/204; B01D 2257/304; B01D 2257/504; B01D 53/1425; B01D 53/1456; B01D 53/1493
See application file for complete search history.

(56) References Cited

U.S. PATENT DOCUMENTS 3,598,881 A 8/1971 Kniel et al.
3,696,162 A 10/1972 Kniel
(Continued)

OTHER PUBLICATIONS

U.S. Appl. No. 61/814,602, filed Apr. 22, 2013.

*Primary Examiner* — Cabrena Holecek

(57) ABSTRACT

The invention generally relates to processes for reducing and removing foulant and foulant precursors from regenerated amine mixtures and to equipment useful in such processes. Such amine mixtures are useful for removing one or more acidic gases such as $CO_2$ or $H_2S$ from olefin hydrocarbon streams. A first feed comprising regenerated amine, foulant, and foulant precursors is provided. A second feed comprising aromatic hydrocarbons is provided. The first and second feeds are combined and then separated to form first and second products. The first product is an upgraded regenerated amine mixture that comprises the first feed's amine. The second product comprises second feed's aromatic hydrocarbons and a portion of the first feed's foulant.

16 Claims, 2 Drawing Sheets

(51) Int. Cl.
*C10L 3/10* (2006.01)
*C10K 1/00* (2006.01)
*C10K 1/08* (2006.01)

(56) References Cited

U.S. PATENT DOCUMENTS

| | | |
|---|---|---|
| 3,829,521 A | 8/1974 | Green |
| 3,926,591 A | 12/1975 | Wildmoser et al. |
| 3,989,811 A | 11/1976 | Hill |
| 6,372,121 B1 | 4/2002 | McClain et al. |
| 6,989,046 B1 * | 1/2006 | Slim .................. B01D 53/1456 423/228 |
| 2007/0286783 A1 | 12/2007 | Carrette et al. |

* cited by examiner

REDUCING AND REMOVING FOULANT FROM REGENERATED AMINE MIXTURES

CROSS REFERENCE TO RELATED APPLICATIONS

This application claims the benefit of Ser. No. 61/981,258, filed Apr. 18, 2014, and EP 14169716.9 filed May 23, 2014, the disclosures of which are incorporated by reference in their entireties.

BACKGROUND OF THE INVENTION

The invention generally relates to processes for reducing and removing foulant and foulant precursors from regenerated amine mixtures and to equipment useful in such processes. Such amine mixtures are useful for removing one or more acidic gases such as $CO_2$ or $H_2S$ from olefin containing hydrocarbon streams.

DESCRIPTION OF RELATED ART

Olefins are used to produce many useful products. For example, ethylene and/or propylene are polymerized to produce polymer, such as polyethylene, polypropylene, ethylene-propylene copolymer, etc. Olefins are produced by many conventional processes, including: (1) catalytically converting alcohol, such as methanol; (2) pyrolysing a hydrocarbon-containing feed, as in steam cracking; or (3) catalytically cracking a hydrocarbon feed, as in fluidized catalytic cracking, hydrocracking, etc. Besides olefins, effluents from these processes contain acidic gases for example, $H_2S$ and/or $CO_2$. The effluent also contains diolefin molecules for example, propadiene, cyclopentadiene, isoprene, or butadiene. Additionally, the effluent can contain aldehyde, such as acetaldehyde.

Amine may be utilized for removing one or more acidic gases from a process stream containing olefins. For example, $CO_2$ and $H_2S$ are removed from a steam cracker effluent by contacting the effluent with an amine mixture by an acid gas scrubbing process in an absorber.

Inside the absorber, the amine mixture absorbs acid gases, like $CO_2$ and $H_2S$, and removes them from the olefins process stream. The amine mixture containing the acid gases exits the absorber and is conducted to an amine regeneration system where the mixture is heated in a regenerator to release the acid gases and produce a regenerated amine mixture. The regenerated amine mixture exiting the regeneration system, mostly free of acid gases, is returned to the absorber where the process is repeated.

A significant hurdle to operation of an acid gas scrubbing process is buildup of polymerized foulant, particularly on the regeneration equipment. Polymerization fouling causes the acid gas scrubbing process to limit capacity for the broader olefin production process resulting in significant negative financial impact.

One way to lessen polymerization fouling in the amine regeneration system involves contacting the amine with an aromatic stream such as pyrolysis gasoline to remove a majority of foulant precursors upstream of the regenerator. See, e.g., U.S. Pat. No. 3,926,591. Foulant precursors are transferred to the aromatic stream, producing a rich aromatic stream (i.e., an aromatic stream rich in foulant) which is conducted away from the process. However, even with this known procedure, it is not possible to keep all the foulant precursors away from the regeneration system. As a consequence, polymerization fouling of regeneration system equipment, particularly equipment downstream of the regenerator that is contacted by the foulant-containing regenerated amine, remains a capacity limiting problem for the broader olefin process.

U.S. Pat. No. 6,989,046 describes adding a heavy hydrocarbon solvent upstream of the regenerator and leaving a portion of the solvent entrained in the amine being fed to the regenerator. However, the specific gravity of the heavy hydrocarbon solvent limits separation and removal efficiency. Further, adding solvent upstream of the regenerator leads to undesirable solvent in the regenerator overhead stream.

An improved process is therefore desired which reduces foulant and foulant precursor concentration in regenerated amine and even removes foulant buildup from the equipment contacted by regenerated amine.

SUMMARY OF THE INVENTION

The present invention is directed to a process that satisfies this need. The invention generally relates to a regenerated amine upgrading process to reduce foulant and foulant precursor concentration in the regenerated amine and/or reverse fouling in equipment contacted by the regenerated amine. The process comprises a number of steps. First, provide a first feed comprising regenerated amine, foulant, and foulant precursors. Second, provide a second feed comprising aromatic hydrocarbons. Third, combine the first and second feeds. Fourth, separate first and second products from the combined first and second feeds. The first product is an upgraded regenerated amine mixture that comprises $\geq 60.0$ wt. % (preferably, $\geq 70.0$ wt. %, $\geq 80.0$ wt. %, $\geq 90.0$ wt. %, or $\geq 95.0$ wt. %) of the first feed's amine, residual amounts of the second feed's aromatic hydrocarbons, and residual amounts of the first feed's foulant and foulant precursors. The second product comprises $\geq 40.0$ wt. % of the second feed's aromatic hydrocarbons (preferably $\geq 50.0$ wt. %, $\geq 60.0$ wt. %, $\geq 70.0$ wt. %, $\geq 80.0$ wt. %, $\geq 90.0$ wt. %, or $\geq 95.0$ wt. % of the second feed's aromatic hydrocarbons), at least a portion of the first feed's foulant and foulant precursors (preferably $\geq 10.0$ wt. %, $\geq 20.0$ wt. %, $\geq 30.0$ wt. %, $\geq 40.0$ wt. %, $\geq 50.0$ wt. %, $\geq 60.0$ wt. %, $\geq 70.0$ wt. %, $\geq 80.0$ wt. %, $\geq 90.0$ wt. %, or $\geq 95.0$ wt. % of the first feed's foulant and foulant precursors), and a residual portion of the first feed's amine (preferably $<40.0$ wt. %, $<30.0$ wt. %, $<20.0$ wt. %, $<10.0$ wt. %, or $<5.0$ wt. % of the first feed's amine).

One advantage of the present invention is the aromatic hydrocarbon is added to the regenerated amine (downstream of regenerator) which reduces concern for undesirable hydrocarbon in regenerator overhead and permits optimization of aromatic hydrocarbon to improve amine separation. To improve the separation, it is desirable for the aromatic second feed to have a specific gravity <0.950.

These and other features, aspects, and advantages of the present invention will become better understood from the following description, appended claims, and accompanying drawings.

DETAILED DESCRIPTION OF THE INVENTION

Definitions

Figure 1:
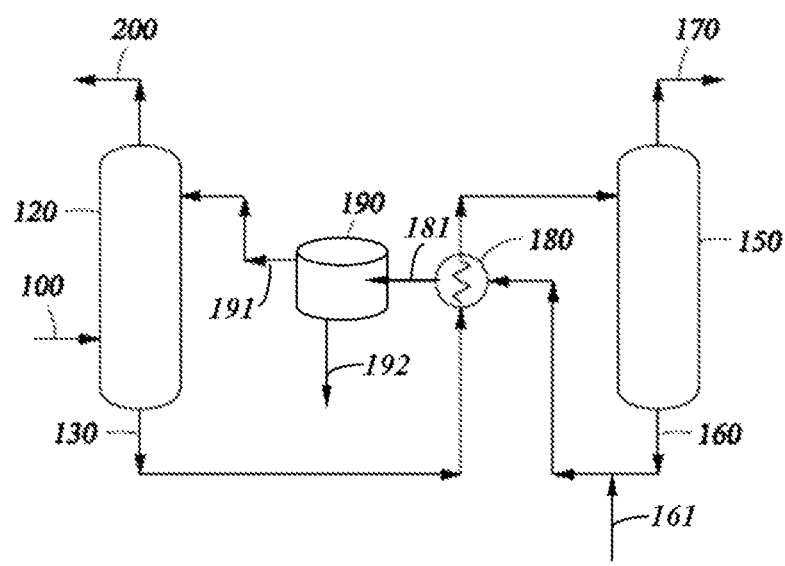
FIG. 1 schematically illustrates a process for reducing foulant and foulant precursor concentration in regenerated amine and removing foulant buildup for equipment contacted by regenerated amine according to the invention.

For the purposes of this description and its appended claims, the term "foulant precursors" means any one or a combination of 1) products of base-induced condensation reactions involving carbonyl compounds in an amine-containing mixture, 2) reactive diolefin molecules, or 3) heat stable salts that lead to degraded amine byproducts.

For the purposes of this description and its appended claims, the term "foulant" means any one or a combination of 1) polymer products of base-induced condensation reactions involving carbonyl compounds in an amine-containing mixture, whether formed by aldol condensation products, by shearing, a combination thereof, or otherwise, 2) sulfur-based polymers formed from $H_2S$ addition across the double bonds in diolefins, in the aldol condensation chain, or in acetaldehyde, 3) polymer products of diolefin molecules, or 4) degraded amine byproducts.

When numerical lower limits and numerical upper limits are listed herein, ranges from any lower limit to any upper limit are contemplated. The term "comprising" is synonymous with the term "including". Likewise whenever a composition, an element or a group of components is preceded with the transitional phrase "comprising", it is understood to also contemplate the same composition or group of components with transitional phrases "consisting essentially of," "consisting of", "selected from the group consisting of," "including," or "is" preceding the recitation of the composition, component, or components, and vice versa.

Description

Many methods for producing unsaturated hydrocarbons produce an effluent process stream containing $C_{2+}$ mono-olefins, diolefins, "acid gas" molecules such as one or more of $CO_2$ or $H_2S$, and carbonyls, such as acetaldehyde. Such methods include catalytically converting alcohol, pyrolysing a hydrocarbon-containing feed, as in steam cracking, or catalytically cracking a hydrocarbon feed, as in fluidized catalytic cracking, hydrocracking, etc.

At least a portion of the $CO_2$ and/or $H_2S$ acid gas may be removed from process streams containing $C_{2+}$ hydrocarbon by contacting the process stream in an absorber with a mixture comprising one or more amines. The $CO_2$ and/or $H_2S$ are absorbed by the amine in the absorber and released when the amine is heated (regenerated) in a regenerator. Before contacting the process stream, the amine mixture is called a "regenerated" amine mixture (also known as a "lean" amine mixture—i.e., containing less $CO_2$ and $H_2S$). Thus, the regenerated amine mixture is located downstream of the regenerator and upstream of the absorber. After contacting the process stream (and absorbing at least a portion of one or more of the process stream's acidic gases) the regenerated amine mixture becomes a "rich" amine mixture. Thus, the rich amine mixture is located downstream of the absorber and upstream of the regenerator. Typically, the regenerated amine mixture comprises at least 10% (preferably at least 50%, even more preferably at least 75%) less $CO_2$ and/or $H_2S$ acid gas (molar basis) than the corresponding rich amine mixture. The $CO_2$ and/or $H_2S$ acid gas concentration (also known as acid gas "loading") can range from at least 0.01 (preferably at least 0.05) moles of acid gas per mole of amine in the regenerated amine mixture up to 0.75 (preferably up to 0.5) moles of acid gas per mole of amine in the rich amine mixture.

Because amine-containing mixtures are bases (albeit relatively weak bases, with a pH generally in the range of from about 10 to about 12), base-induced condensation reactions can occur (e.g., aldol condensation reactions) involving the carbonyl compounds, including aldehydes (e.g., acetaldehyde) and/or ketones. Foulant precursors and foulant resulting from condensation can appear as an oil having a reddish or reddish-brown color ("red oil"). Red oil can be present in an aromatics-soluble liquid phase, or, more commonly, in the form of an emulsion of the red oil and an aqueous component. The emulsion can comprise the amine mixture, aldol condensation products, and polymer formed from the aldol condensation products. Shearing of the red oil, e.g., shearing of the emulsion, has been observed to result in further polymerization of the aldol condensation products.

Additionally, it is believed that diolefins are carried into the amine mixture by solubility in the amine mixture and also by at least the mechanism where the amine mixture condenses some heavier diolefin hydrocarbons that are present in the hydrocarbon process stream, e.g., cyclopentadiene, isoprene, or butadiene. The reactive diolefins undergo addition type polymerization to various degrees promoted by the heat of the regenerator and shearing of circulation pumps, even to the point of reaching a molecular weight which renders certain polymer species insoluble in the amine mixture such that they precipitate out of solution. Foulant can also form from degraded amine byproducts, for example, hydroxyethyl-ethylenediamine (HEED), that form from heat stable salts. Sulfur-based foulant can result from $H_2S$ addition across double bonds in diolefins, in the aldol condensation chain, or in the addition product of acetaldehyde.

Foulant precursors and foulant in the regenerated amine mixture adhere to equipment contacted by the mixture including the interconnecting piping, for example, a feed-effluent heat exchanger downstream of the regenerator and upstream of the absorber. This polymer buildup reduces heat transfer and/or pump capacity and consequently removal efficiency of $CO_2$ and $H_2S$ from the process stream. Removing the deposited polymer, generally with the regenerator (and absorber) off-line, is time consuming and expensive.

Fouling of the equipment contacted by the foulant-containing regenerated amine is lessened or even at least partially reversed, by removing from the regenerated amine mixture at least a portion of that mixture's foulant precursors and foulant to produce an upgraded regenerated amine mixture. This is accomplished by combining the regenerated amine mixture (first feed) with a second feed comprising aromatic hydrocarbons, which leads to a transfer of at least a portion of the foulant precursors and foulant from the first feed (in which foulant and foulant precursors are generally not miscible) to the second feed (in which the foulant and foulant precursors are generally miscible). The combined first and second feeds are conducted to a separator vessel. Additionally, at least a portion of any foulant buildup on the feed-effluent heat exchanger interconnecting piping, and/or other equipment contacted by the combined first and second feeds, is transferred to the combined first and second feeds. In the separator vessel, the combined mixtures are separated to form (a) an upgraded regenerated amine mixture (first product) comprising amine and (b) a rich aromatic mixture (second product) comprising amine, aromatic hydrocarbons, foulant and foulant precursors. The first product comprises ≥60.0 wt. % (preferably, ≥70.0 wt. %, ≥80.0 wt. %, ≥90.0 wt. %, or ≥95.0 wt. %) of the first feed's amine, residual amounts of the aromatic mixture's (second feed's) aromatic hydrocarbons, and residual amounts of the regenerated amine mixture's (first feed's) foulant and foulant precursors. The second product comprises ≥40.0 wt. % of the second feed's aromatic hydrocarbons (preferably ≥50.0 wt. %, ≥60.0 wt. %, ≥70.0 wt. %, ≥80.0 wt. %, ≥90.0 wt. %, or ≥95.0 wt. % of the second feed's aromatic hydrocarbons), at least a portion of the first feed's foulant and foulant precursors (preferably ≥10.0 wt. %, ≥20.0 wt. %, ≥30.0 wt. %, ≥40.0 wt. %, ≥50.0 wt. %, ≥60.0 wt. %, ≥70.0 wt. %, ≥80.0 wt. %, ≥90.0 wt. %, or ≥95.0 wt. % of the first feed's foulant and foulant precursors), and a residual portion of the first feed's amine (preferably <40.0 wt. %, <30.0 wt. %, <20.0 wt. %, <10.0 wt. %, or <5.0 wt. % of the first feed's amine).

The invention will now be described in more detail with respect to a broader amine absorber/regenerator system for removing acid gas from a process stream containing $C_{2+}$ olefin, foulant precursors, and acid gas molecules such as one or more of $CO_2$ and $H_2S$. The invention is not limited to this embodiment, and this description is not meant to foreclose other embodiments within the broader scope of the invention.

As illustrated by FIG. 1, a regenerated amine mixture is provided via line 191 to absorber 120. A process stream is also provided via line 100 to absorber 120 where the process stream contacts and combines with the regenerated amine mixture. At least a portion of the process stream's $H_2S$ and/or $CO_2$ acid gases are removed from the process stream in absorber 120, and an upgraded process stream is conducted away from absorber 120 via line 200. The upgraded process stream contains lesser amounts of $H_2S$ and/or $CO_2$ than the process stream, such as 50% less $H_2S$ and/or $CO_2$, or 75% less, or 90% less (on a weight basis). The remaining portion of the process stream's $H_2S$ and/or $CO_2$ acidic gases are transferred from the process stream to the regenerated amine mixture in absorber 120, and the $H_2S$ and/or $CO_2$ acid gases (or ionized components thereof) are conducted away as components of a rich amine mixture via line 130. Additionally, at least a portion of the process stream's foulant precursors are transferred to and conducted away as components of the rich amine mixture.

Operating conditions in absorber 120 are well known to one having ordinary skill in the art and are determined in part by the type of amine as well as the types and amounts of acid gases present in the process stream. A non-limiting example of the absorber 120 operating conditions includes a temperature in the range of about 35° C. to about 55° C., a pressure in the range of about 5 bar to about 20 bar, and a sufficient amine mixture flow rate to maintain the concentration of acid gas in the rich amine below 0.75 moles of acid gas per mole of amine. Although not required in all cases, the invention is compatible with additional acid gas removal stages (not shown in FIG. 1), such as those utilizing caustic for removing $CO_2$ from the upgraded process stream.

The rich amine mixture is conducted via line 130 to feed-effluent heat exchanger 180, where the rich amine mixture is pre-heated and then conducted to regenerator 150 for regeneration. Optionally, the feed-effluent heat exchanger 180 is replaced by separate heating and cooling heat exchangers (not shown). Regeneration conditions in regenerator 150 are well known to one having ordinary skill in the art and may include a temperature in the range of about 105° C. to about 150° C. The regeneration is conducted under conditions that are sufficient to remove from the rich amine mixture at least a portion (at least 10%, preferably at least 50%, more preferably at least 75% on a molar basis) of the rich amine mixture's $H_2S$ and/or $CO_2$ ions. $H_2S$ and/or $CO_2$ removed from the rich amine mixture is conducted away from regenerator 150 via line 170. The $H_2S$ can be, for example, converted to elemental sulfur in a conventional process, such as the Claus process. A regenerated amine mixture (first feed) contains the remainder of the rich amine mixture's $H_2S$ and/or $CO_2$ ions (typically, greater than 0.01 moles of $H_2S$ and/or $CO_2$ ions per mole of amine) as well as foulant and unpolymerized foulant precursors. The regenerated amine mixture is conducted away from regenerator 150 via line 160.

In accordance with the invention, the regenerated amine mixture (first feed) in line 160 is combined with an aromatic mixture (second feed) provided via line 161. At least a portion of any foulant and foulant precursors are transferred from the regenerated amine mixture to the aromatic mixture. The combined mixtures are conducted through feed-effluent heat exchanger 180 (for transferring heat to the rich amine mixture from line 130). The aromatic mixture also removes at least a portion of any foulant buildup from the feed-effluent heat exchanger 180 and other piping and equipment the aromatic mixture contacts.

Surprisingly, the aromatic mixture's efficacy is sufficient to require only modest amounts of the aromatic mixture. This is beneficial because the present use of the second feed is generally considered detrimental because it represents a loss of a relatively high value stream (aromatics) to a relatively low value stream (aromatics, foulant, and amine). Accordingly, the concentration of the aromatic mixture (second feed) in the combined mixtures may be optimized (minimized) by one having ordinary skill in the art to provide adequate foulant removal while consuming as little of the high value aromatic as possible. The aromatic mixture (second feed) may be ≤5.0 wt. % for example, ≤1.0 wt. %, such as ≤0.1 wt. %, ≤0.075 wt. %, ≤0.070 wt. %, ≤0.03 wt. % of the combined mixtures (first and second feeds).

The combined mixtures are conducted via line 181 to separator vessel 190. Separator vessel 190 may be a gravity-type separator (settling drum), surge tank with top and bottom skimming facility, liquid phase separation drum, a single or series of hydrocyclonic separation device(s), or other liquid phase separation devices known in the art. To improve the separation in separator 190, it is desirable for the aromatics mixture (second feed) to have a specific gravity <0.950, for example, ≤0.945, ≤0.940, preferably ≤0.935, such as ≤0.930, ≤0.925, or ≤0.920.

An upgraded regenerated amine mixture (first product) is separated and conducted away from vessel 190 via line 191 and returned to the absorber 120. The upgraded regenerated amine mixture comprises ≥60.0 wt. % of the regenerated amine mixture's (first feed's) amine, residual amounts of the aromatic mixture's (second feed's) aromatic hydrocarbons, and residual amounts of the regenerated amine mixture's (first feed's) foulant and foulant precursors. Optionally, filtration may be utilized to further remove at least a portion of any foulant remaining in the upgraded regenerated amine mixture.

A rich aromatics mixture (second product) is separated and conducted away from separator 190 via line 192. Surprisingly, it has been observed that the combined mixtures may form three liquid phases, a lighter aromatic mixture phase (a portion of which may be emulsion with amine), an amine phase, and a heavier aromatic mixture phase. While not wishing to be bound by any theory or model, it is believed that a portion of the polymer foulant has sufficient density such that, when combined with the aromatic second feed, produces a portion of the combined solution that has specific gravity heavier than the amine mixture. Accordingly, the second product is preferably separated and removed both from above (a top portion) and below (a bottom portion) the first product (upgraded regenerated amine mixture). Optionally, the second product is separated and removed solely from either above or below the first product, if either the top or bottom portion is not generated in the process. Additionally optional, the top and bottom portions of the second product are conducted away separately via line 192 and a separate line not illustrated in FIG. 1.

The rich aromatics mixture (second product) comprises the second feed's aromatic hydrocarbons, the first feed's foulant and foulant precursors, and a residual portion of the first feed's amine. In the low amount utilized in present invention, the rich aromatics mixture conducted away via line 192 is generally utilized for lower-value purposes such as a component for blending heavy fuel. Optionally however, the rich aromatics mixture (second product) may be further processed to recover valuable aromatic hydrocarbon.

In an optional preliminary step (not illustrated in FIG. 1), the rich amine mixture in line 130 is contacted with a separate aromatic mixture (not shown) upstream of the regenerator to remove at least a portion of the foulant precursors and produce an upgraded rich amine mixture and a rich aromatic mixture. The aromatic mixture in this optional preliminary step may be a portion of the same aromatic mixture used to provide the second feed or it may be a different aromatic mixture. Suitable examples of such an optional preliminary step are disclosed in U.S. Pat. Nos. 3,598,881, and 3,926,591; and U.S. Patent Application No. 61/814,602 which are incorporated herein in their entirety. Subsequent to the optional preliminary step, the upgraded rich amine is conducted via line 130, preheated in feed-effluent heat exchanger 180, and is regenerated in regenerator 150 as specified to produce the regenerated amine mixture (first feed). As discussed in the background above, absent the invention, this optional preliminary step does not keep all the foulant precursors away from the regeneration system as demonstrated by Example 1 described later in this application.

The invention may be operated continuously. Alternatively, the invention may be operated semi-continuously, or in batch mode.

Optionally, the foulant precursors and foulant originate from a process stream produced by steam cracking. In another option, the process stream comprises ≥0.15 wt. % $H_2S$, based on the weight of the process stream. In yet another option, the process stream comprises ≥0.10 wt. % $CO_2$, based on the weight of the process stream.

The first and second feeds will now be described in more detail. The invention is not limited to these mixtures, and this description is not meant to foreclose other mixtures within the broader scope of the invention.

The first feed is a regenerated amine mixture comprising one or more amines, and optionally water. Conventional amine mixtures are suitable for use in the invention, but the invention is not limited thereto. If desired, the amine mixture can further comprise one or more physical solvents, e.g., those disclosed in U.S. Pat. No. 3,989,811 and/or one or more additives (e.g., for lessening the effects of fouling) such as those disclosed in U.S. Pat. No. 6,372,121. The amines utilized can be, e.g., alkanolamines and mixtures thereof. Alkanolamines are molecules containing both amine and hydroxyl groups. The first feed may comprise 5.0 wt. % to 70.0 wt. % of one or more primary, secondary, or tertiary alkanolamine, based on the weight of the first feed. The amine can include of one or more of monoethanolamine, diethanolamine, methyl diethanolamine, or dipropanolamine, and the first feed's amine can comprises ≥50.0 wt. % of one or more of monoethanolamine ("MEA"), diethanolamine ("DEA"), methyl diethanolamine ("MDEA"), or dipropanolamine ("DPA"), based on the weight of amine in the first feed. Preferably, the amine mixture may comprise an aqueous mixture of one or more amine and water.

The first feed also contains foulant precursors and foulant. Additionally, the first feed contains ionic components derived from $CO_2$ or $H_2S$ acid gases that remain in the amine after being processed in the regenerator, for example, ≥0.01 moles of ionic components per mole of amine. Together, the first feed may comprise ≥5.0 wt. % of one or more alkanolamine and ≥0.01 wt. % of a mixture of foulants and/or foulant precursors, the weight percents being based on the weight of the first feed, and additionally ≥0.01 moles of ionic components derived from $CO_2$ or $H_2S$ per mole of amine, the balance of the first feed being water. For example, the first feed can comprise 5.0 wt. % to about 70 wt. % of alkanolamine (e.g., one or more of MEA, DEA, or DPA, such as MEA); about 0.01 wt. % to about 10.0 wt. % of a mixture of foulant and foulant precursors; and additionally at least 0.01 moles of ionic components derived from $CO_2$ or $H_2S$ per mole of amine; the balance of the first feed being water.

The second feed is a mixture of aromatics, such as ≥50.0 wt. % (preferably ≥75 wt. %, more preferably ≥90 wt. %) of aromatics, based on the weight of the second feed. The aromatics can be a mixture of one or more of $C_{7+}$ aromatics (for example, $C_{8+}$ aromatics, $C_{9+}$ aromatics, preferably $C_{10+}$ aromatics). The second feed generally comprises ≥90.0 wt. % hydrocarbon, based on the weight of the second feed. The lower specific gravity range of the aromatic second feed is related to the vapor pressure of the second feed. The vapor pressure of the second feed is selected within design tolerances of the separator vessel (190 in FIG. 1) as well as other equipment containing the second feed (for example, piping and circulation pumps). The specific gravity of the second feed may be ≥0.800, for example, ≥0.805, ≥0.810, or ≥0.820.

Example 1

Example 1 describes an operating embodiment of the invention as part of an amine absorber/regenerator system for removing acid gas from a process stream containing $C_{2+}$ olefin, foulant precursors, and $CO_2$ and $H_2S$ acid gas where the process stream is produced by steam cracking. The invention is not limited to this embodiment, and this description is not meant to foreclose other embodiments within the broader scope of the invention.

Referring to FIG. 1, a regenerated amine mixture is provided via line 160. The regenerated amine mixture is derived from an upgraded rich amine mixture. Nevertheless, the regenerated amine mixture (first feed) contains foulant and foulant precursors. An aromatic mixture (second feed) is provided via line 161. The aromatic mixture comprises >99.0 wt. % $C_{10+}$ aromatics. The aromatic mixture has specific gravity of 0.932. The aromatic mixture is combined with the regenerated amine mixture to a concentration of ≤0.07 wt. % aromatic mixture, based on the weight of the combined mixtures.

The combined mixtures are conducted through feed-effluent heat exchanger 180 and further conducted via line 181 to gravity separator 190 which has a residence time of about 2 hours. The combined regenerated amine mixture (first feed) and aromatic mixture (second feed) are separated to form an upgraded regenerated amine mixture (first product) and a rich aromatic mixture (second product). At least a portion (bottom portion) of the rich aromatics mixture is separated and removed from the bottom of separator 190. Additionally, at least a portion (top portion) of the rich aromatic mixture is skimmed from the top of separator 190. The upgraded regenerated amine mixture (first product) is separated and drawn off the middle of separator 190 and conducted via line 191 back to absorber 120. Samples of the upgraded regenerated amine mixture show no visible entrained hydrocarbon. The top and bottom portions of rich aromatics mixture (second product) are combined and conducted away from separator 190 via line 192. The combined rich aromatics mixture contains the regenerated amine mixture's (first feed's) foulant and foulant precursors as well as any foulant removed from feed-effluent heat exchanger 180 or other equipment the aromatic mixture (second feed) contacted. Since the rich aromatics mixture contains a foulant, foulant precursors, and amine, it is conducted away via line 192 for disposal.

Figure 2:
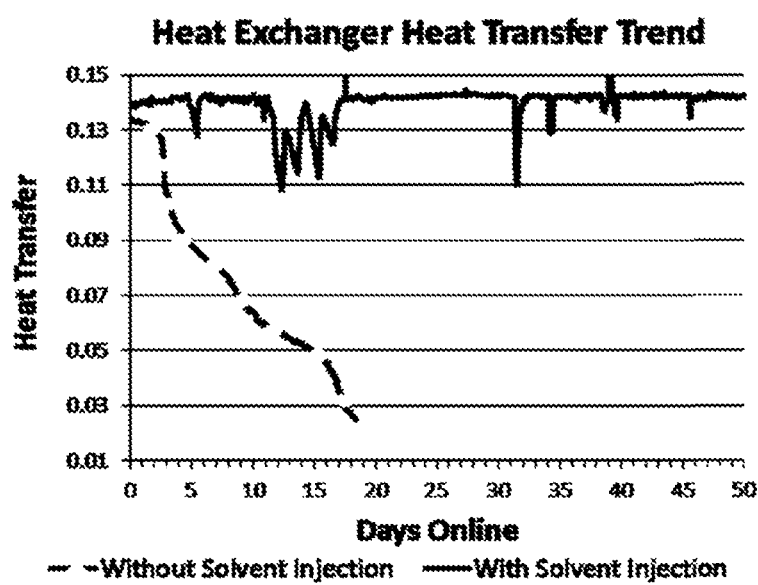
FIG. 2 presents operational data from a process operated with and without present invention.

Referring to FIG. 2, the heat transfer coefficient of the feed-effluent heat exchanger 180 described in Example 1 declines approximately 75% over the course of only 17 days of operation without addition of aromatic second feed (labeled "Without Solvent Injection" in FIG. 2). Upon inspection of the exchanger, foulant buildup is found to be the cause of the reduced heat transfer. Conversely, there is no observable decline, over a 210 day run (first 50 days of the 210+ day run are illustrated in FIG. 2), in heat transfer coefficient of the feed-effluent heat exchanger 180 as long as the aromatic mixture (second feed) is added to the regenerated amine mixture (first feed). When treatment with the aromatic mixture is halted, the heat transfer coefficient begins to decline sharply due to foulant buildup on the heat exchanger internals. However, when treatment with the aromatic mixture is resumed, the heat transfer coefficient is recovered to baseline performance indicating that at least some of the foulant on the exchanger has been removed.

Having described the various aspects of the process herein, further specific embodiments of the invention include those set forth in the following paragraphs.

Embodiment A

A regenerated amine upgrading process to reduce foulant and foulant precursor concentration in the regenerated amine and/or reverse fouling in equipment contacted by the regenerated amine, comprising: (a) providing a first feed comprising regenerated amine, foulant, and foulant precursors; (b) providing a second feed comprising aromatic hydrocarbons; (c) combining the first and second feeds; and (d) separating first and second products from the combined first and second feeds, wherein (i) the first product is an upgraded regenerated amine mixture that comprises ≥60.0 wt. % of the first feed's amine, residual amounts of the second feed's aromatic hydrocarbons, and residual amounts of the first feed's foulant and foulant precursors, and (ii) the second product comprises ≥40.0 wt. % of the second feed's aromatic hydrocarbons, at least a portion of the first feed's foulant and foulant precursors, and a residual portion of the first feed's amine.

Embodiment B

The process of Embodiment A, wherein at least a portion of any foulant buildup on equipment contacted by the combined first and second feeds is transferred to the combined first and second feeds.

Embodiment C

The process of any one of Embodiments A to B, wherein (i) the separating step (d) comprises gravity separation and (ii) the second feed has a specific gravity <0.950.

Embodiment D

The process of any one of Embodiments A to C, wherein the first feed is derived from an upgraded rich amine mixture.

Embodiment E

The process of any one of Embodiments A to D, wherein the foulant precursors and foulant originate from a process stream produced by steam cracking.

Embodiment F

The process of Embodiment E, wherein the process stream comprises ≥0.15 wt. % $H_2S$, based on the weight of the process stream.

Embodiment G

The process of any one of Embodiments E to F, wherein the process stream further comprises ≥0.1 wt. % $CO_2$, based on the weight of the process stream.

Embodiment H

The process of any one of Embodiments A to G, wherein the second feed is ≤0.5 wt. % of the combined first and second feeds, based on weight of the combined first and second feeds.

Embodiment I

The process of any one of Embodiments A to H, wherein the second feed is ≤0.03 wt. % of the combined first and second feeds.

Embodiment J

The process of any one of Embodiments A to I, wherein the first feed comprises 5.0 wt. % to 60.0 wt. % of one or more primary, secondary, or tertiary alkanolamine.

Embodiment K

The process of any one of Embodiments A to J, wherein the second feed comprises ≥65.0 wt. % of $C_{10+}$ aromatic hydrocarbons, based on the weight of the second feed.

Embodiment L

The process of any one of Embodiments A to K, wherein the second feed comprises ≥50.0 wt. % of aromatic hydrocarbons, based on the weight of the second feed.

Embodiment M

The process of any one of Embodiments A to L, wherein (i) the separating step (d) comprises gravity separation and (ii) the second product comprises a top portion separated from above the first product and a bottom portion separated from below the first product.

Embodiment N

The process of any one of Embodiments A to M, wherein (i) the separating step (d) comprises gravity separation and (ii) the second feed has a specific gravity ≤0.945.

Embodiment O

The process of any one of Embodiments A to M, wherein (i) the separating step (d) comprises gravity separation and (ii) the second feed has a specific gravity ≤0.940.

Embodiment P

The process of any one of Embodiments A to M, wherein (i) the separating step (d) comprises gravity separation and (ii) the second feed has a specific gravity ≤0.935.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

What is claimed is:

1. A regenerated amine upgrading process to reduce foulant concentration in the regenerated amine, comprising:
   (a) providing a first feed comprising regenerated amine and foulant;
   (b) providing a second feed comprising aromatic hydrocarbons;
   (c) combining the first and second feeds; and
   (d) separating first and second products from the combined first and second feeds, wherein (i) the first product is an upgraded regenerated amine mixture that comprises >60.0 wt. % of the first feed's amine, residual amounts of the second feed's aromatic hydrocarbons, and residual amounts of the first feed's foulant, and (ii) the second product comprises ≥40.0 wt. % of the second feed's aromatic hydrocarbons, at least a portion of the first feed's foulant, and a residual portion of the first feed's amine.

2. The process of claim 1, further comprising the step of conducting the combined first and second feeds from step (c) through equipment, comprising one or more of a heat exchanger and piping, prior to performing the separation in step (d), wherein at least a portion of any foulant buildup on the equipment is transferred to the combined first and second feeds.

3. The process of claim 1, wherein (i) the separating step (d) comprises gravity separation and (ii) the second feed has a specific gravity <0.950 (g/cm$^3$ second feed)/(g/cm$^3$ water).

4. The process of claim 1, wherein the first feed is derived from an upgraded rich amine mixture.

5. The process of claim 1, wherein the foulant originate from a process stream produced by steam cracking.

6. The process of claim 5, wherein the process stream comprises ≥0.15 wt. % H$_2$S, based on the weight of the process stream.

7. The process of claim 5, wherein the process stream further comprises ≥0.1 wt. % CO$_2$, based on the weight of the process stream.

8. The process of claim 1, wherein the second feed is ≥0.5 wt. % of the combined first and second feeds, based on weight of the combined first and second feeds.

9. The process of claim 1, wherein the second feed is ≥0.03 wt. % of the combined first and second feeds.

10. The process of claim 1, wherein the first feed comprises 5.0 wt. % to 60.0 wt. % of one or more primary, secondary, or tertiary alkanolamines.

11. The process of claim 1, wherein the second feed comprises ≥65.0 wt. % of C$_{10+}$ aromatic hydrocarbons, based on the weight of the second feed.

12. The process of claim 1, wherein the second feed comprises ≥50.0 wt. % of aromatic hydrocarbons, based on the weight of the second feed.

13. The process of claim 1, wherein (i) the separating step (d) comprises gravity separation and (ii) the second product comprises a top portion separated from above the first product and a bottom portion separated from below the first product.

14. The process of claim 1, wherein (i) the separating step (d) comprises gravity separation and (ii) the second feed has a specific gravity ≥0.945 (g/cm$^3$ second feed)/(g/cm$^3$ water).

15. The process of claim 1, wherein (i) the separating step (d) comprises gravity separation and (ii) the second feed has a specific gravity ≥0.940 (g/cm$^3$ second feed)/(g/cm$^3$ water).

16. The process of claim 1, wherein (i) the separating step (d) comprises gravity separation and (ii) the second feed has a specific gravity ≥0.935 (g/cm$^3$ second feed)/(g/cm$^3$ water).

* * * * *